United States Patent
Kellerman

[19]

[11] Patent Number: 6,126,104
[45] Date of Patent: Oct. 3, 2000

[54] ADAPTER FOR FISHING REEL DRIVE MOTOR

[76] Inventor: Donald R. Kellerman, 815 Hwy. P, O'Fallon, Mo. 63366

[21] Appl. No.: 09/246,246

[22] Filed: Feb. 8, 1999

[51] Int. Cl.$^7$ ........................ A01K 89/012; A01K 89/017
[52] U.S. Cl. .............................. 242/225; 43/21; 242/250; 242/323
[58] Field of Search .................................... 242/225, 250, 242/323; 43/21

[56] References Cited

U.S. PATENT DOCUMENTS

| | | | |
|---|---|---|---|
| 2,262,637 | 11/1941 | Fanshier | 43/21 |
| 2,262,671 | 11/1941 | Fanshier | 242/250 |
| 3,077,318 | 2/1963 | Du Val | 242/250 |
| 3,216,145 | 11/1965 | Aunspaugh | 242/250 |
| 3,229,406 | 1/1966 | Binkley | 43/21 |
| 3,348,788 | 10/1967 | Vinokur | 43/21 |
| 3,409,245 | 11/1968 | Grace | 242/250 |
| 3,411,230 | 11/1968 | Hopper | 242/225 |
| 3,463,415 | 8/1969 | Lingle | 242/225 |
| 4,344,587 | 8/1982 | Hildreth | 242/250 |
| 4,515,324 | 5/1985 | Barton . | |
| 4,634,072 | 1/1987 | Stealy . | |
| 4,951,890 | 8/1990 | Sossamon . | |
| 4,962,901 | 10/1990 | Shirley et al. | 242/250 |
| 5,004,181 | 4/1991 | Fowles . | |
| 5,042,188 | 8/1991 | Ho . | |
| 5,088,657 | 2/1992 | Chen . | |
| 5,400,979 | 3/1995 | Goodman . | |

*Primary Examiner*—Katherine A. Matecki
*Attorney, Agent, or Firm*—Polster, Lieber, Woodruff & Luchesi LC

[57] ABSTRACT

A fishing rod adapter for interconnecting a hand-held power tool and a fishing reel comprises a fishing rod connector adapted to received the shaft of a traditional hand-held fishing rod, a cylindrically hollow housing having anterior and posterior axial openings, and a drive mechanism disposed partially within the housing. The fishing rod connector is adapted to detachably seat within the anterior opening of the housing, such that the housing provides a handle or base for the fishing rod shaft, suitable for gripping with one hand. Within the housing, adjacent the anterior opening is the internal drive mechanism comprising a axially aligned shaft receiver and a number of transfer gears. The posterior opening of the housing is configured to detachably secure a hand-held power tool within the housing, opposite the fishing rod shaft, such that a drive shaft of the power tool is operatively coupled to the shaft receiver of the internal drive mechanism. The transfer gear combination within the drive mechanism transfers the axially aligned rotary motion generated by the drive shaft of the power tool to a radial drive gear disposed external to the housing. Additional fittings on the exterior surface of the housing are adapted to receive and secure a traditional hand-cranked fishing reel in a spaced relationship to the external drive gear. Removal and replacement of the crank handle on the fishing reel with a reel shaft and gear combination permits an operative engagement between the fishing reel and the power tool through the transfer gears and radial drive gear, such that actuation of the power tool results in a rapid rewinding of any fishing line previously dispensed from the fishing reel.

17 Claims, 5 Drawing Sheets

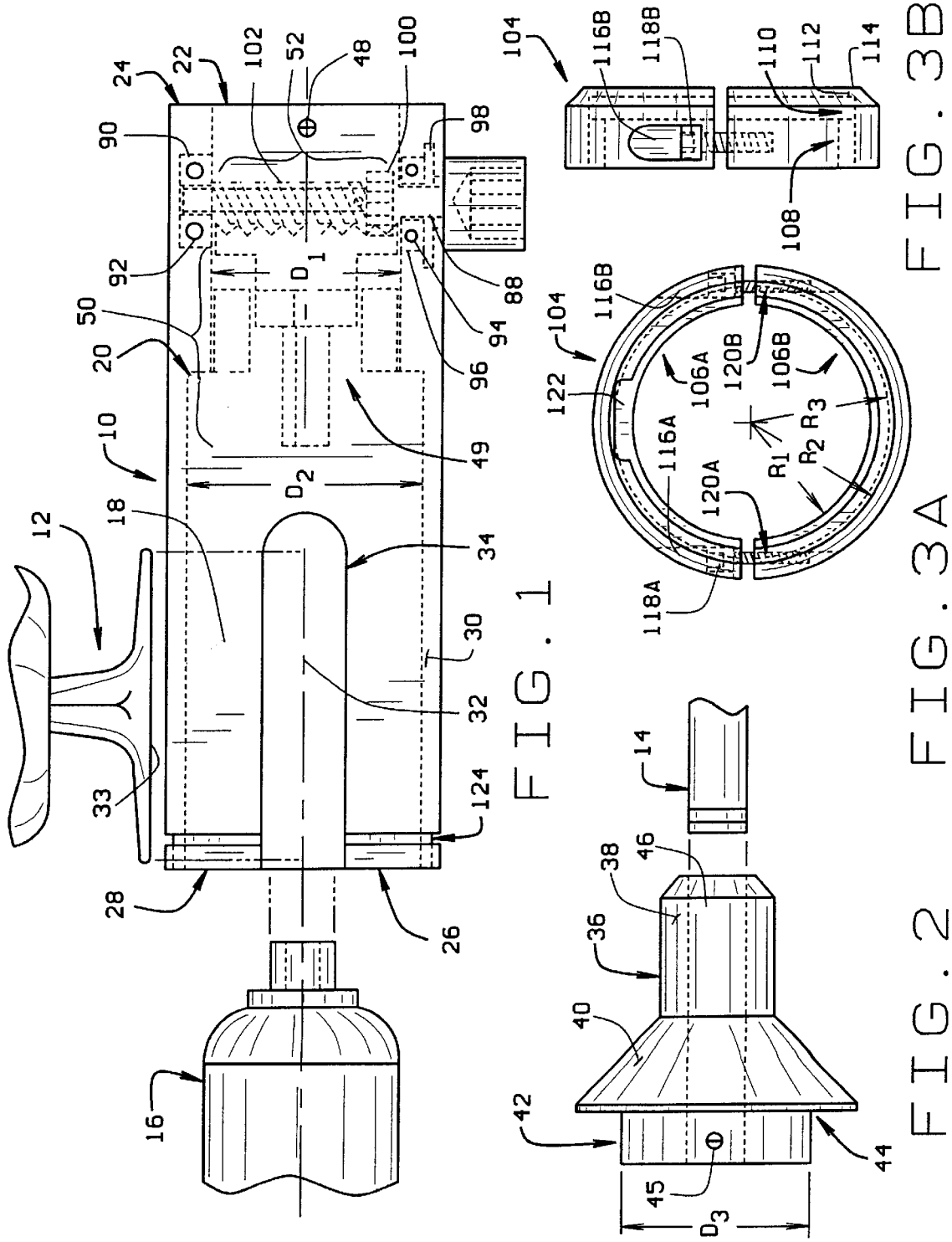

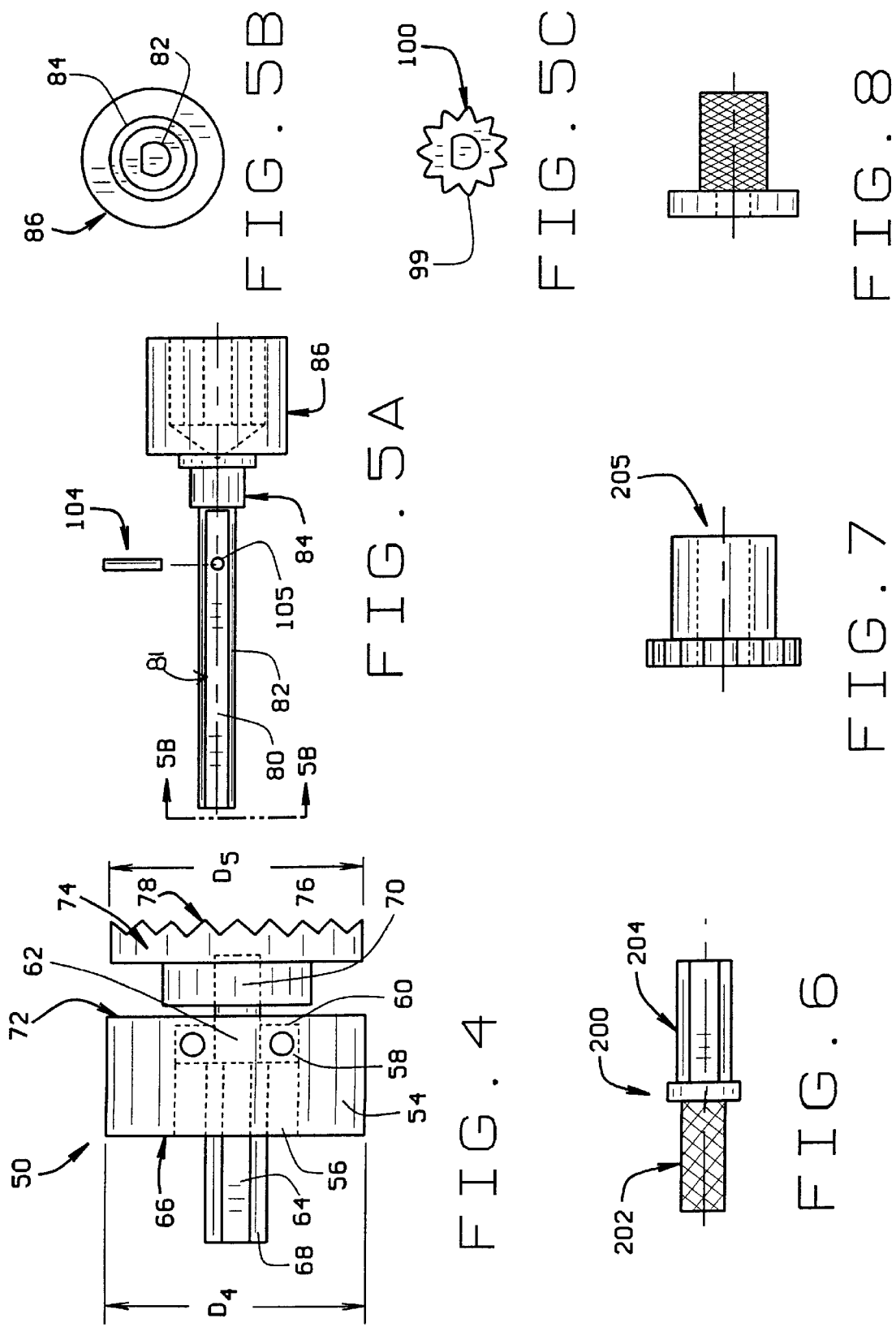

ADAPTER FOR FISHING REEL DRIVE MOTOR

BACKGROUND OF THE INVENTION

This invention relates generally to sport fishing equipment, and more particularly, to a fishing rod adapter for holding a detachable motor unit and for mechanically connecting an output shaft of the motor to a fishing reel gear mechanism, thereby facilitating motorized rewinding of fishing line cast from the fishing reel.

There are many different types of fishing reels currently available on the market, including bait casting reels and spin casting reels. Regular spinning reels are generally driven by a hand crank or handle to recover fishing line previously cast out from the face of the reel. Several limitations are placed on the users of spinning reels by the traditional design of such reels. For example, the fisherman must have one hand holding the fishing rod and the other hand turning the hand crank or handle to recover the fishing line. Such two-handed operation becomes difficult when a fish is caught, as the motions of the fish may require the fisherman to place both hands on the fishing rod to control it, and forgo winding in the line until such time as the fish reduces its efforts to break free of the line. Similarly, the necessity of two-handed use precludes the use of spin-casting reels by handicapped individuals who may not have full use of both hands. For such individuals, reeling in fishing line can be a significant challenge, or completely impossible with the conventional fishing rod and reel combination.

Recognizing this shortcoming of conventional fishing reels, numerous prior art attempts have been made to improve the operation of traditional fishing reels through the inclusion of a variety of motorized drives. For example, U.S. Pat. No. 5,400,979 to Goodman discloses a custom designed fishing reel configured to actuate in a reciprocal motion while rewinding the line. An axially mounted electric motor is coupled to the fishing reel through a driveshaft, thereby providing the driving force to rewind cast fishing line.

U.S. Pat. No. 5,088,657 to Chen discloses a motorized spinning reel driving device for fastening to a fishing reel without altering the original structure of the rod or reel. The device includes a drive shaft, drive motor, and power source disposed laterally from the fishing reel, replacing the traditional hand cranking mechanism.

U.S. Pat. No. 5,004,181 to Fowles discloses a cordless electric fishing reel interconnected through a set of planetary gears and ratchet mechanisms to a drive motor mounted in a specially configured hollow handle. The specially designed fishing reel and planetary gear transmission provide an enhanced mechanical advantage to the reel, thereby facilitating the rewinding of cast fishing line.

Finally, U.S. Pat. No. 4,634,072 to Stealy teaches a custom designed motorized fishing reel incorporating a digital line counter. The line counter and reel rewind motor are powered by a combination of batteries and solar cells. A variable resistance switch is included to regulate the speed and power of the motor for "playing" a fish. The resistive force of the motor in an unactuated state and the associated gearing provide a braking force on dispensed line.

While each of these devices incorporates a motorized drive mechanism, none may be conveniently adapted for use with commonly available fishing reels and rechargable battery powered motorized drive mechanisms. Incorporating custom designed fishing reels with sophisticated motors or drive mechanisms as taught by the prior art greatly increases the cost associated with the fishing equipment. Additionally, many fishing enthusiasts prefer the feel or action of a particular brand of fishing reel, rod, or combination thereof, as well as the option of quickly changing rod and reel combinations to suit a particular type of sport fishing such as trout fishing or trawling.

BRIEF SUMMARY OF THE INVENTION

Accordingly, among the several objects and advantages of the present invention are:

The provision of a fishing rod adapter configured to couple a commercially available hand-held power tool such as a rechargeable screwdriver with a variety of traditional fishing reels;

The provision of the aforementioned fishing rod adapter incorporating an internal drive mechanism to transfer axial rotational motion from a drive motor to a radially disposed external transfer element;

The provision of the aforementioned fishing rod adapter configured to secure a modified traditional fishing reel in a spaced relationship to the external transfer element for mechanical coupling thereto;

The provision of the aforementioned fishing rod adapter which is constructed from durable and corrosion resistant materials;

The provision of the aforementioned fishing rod adapter which is adapted for a quiet operation;

The provision of the aforementioned fishing rod adapter which facilitates interchangeability of fishing rods, fishing reels, and drive motors; and The provision of the aforementioned fishing rod adapter which is simple to manufacture, readily adaptable to a variety of fishing apparatus, and low cost.

Briefly stated, the fishing rod adapter of the present invention facilitates the coupling of a hand-held power tool with a traditional fishing reel. The fishing rod adapter comprises a fishing rod connector adapted to receive the shaft of a traditional hand-held fishing rod, a cylindrically hollow housing having anterior and posterior axial openings, and a drive mechanism disposed partially within the housing body. The fishing rod connector is adapted to seat within the anterior opening of the housing, such that the housing provides a detachable handle or base for the fishing rod shaft suitable for gripping with one hand. Within the housing, adjacent the anterior opening is an internal drive mechanism comprising an axially aligned adapter shaft and a number of transfer gears. The posterior opening of the housing is configured to detachably mount an axial drive motor such as a hand-held power tool or rechargeable screwdriver within the housing, opposite the fishing rod shaft, such that a drive shaft of the motor may be operatively coupled to the adapter shaft of the internal drive mechanism. The transfer gear combination within the drive mechanism transfers the axially aligned rotary motion generated by the drive shaft of the motor to a radial drive gear disposed external to the housing. Fittings on the exterior surface of the housing are adapted to receive a traditional hand-cranked fishing reel in a spaced relationship to the external radial drive gear. Removal and replacement of the crank handle on the fishing reel with a reel shaft and gear combination permits an operative engagement between the fishing reel and the drive motor through the transfer gears and radial drive gear, such that actuation of the drive motor results in a rapid rewinding of any fishing line previously dispensed from the fishing reel.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is view of the cylindrical hollow housing, illustrating the placement of the internal drive transfer mechanism in phantom;

FIG. 2 is a view of the fishing rod connector, illustrating a central bore for receiving a fishing rod base;

FIG. 3A is an end view of a drive motor and reel clamping element;

FIG. 3B is a side view of the drive motor and reel clamping element shown in FIG. 3A;

FIG. 4 is a side view of the axial elements of the internal drive mechanism;

FIG. 5A is a side view of a radially disposed drive shaft for use with the internal drive mechanism;

FIG. 5B is an end view of the radially disposed drive shaft of FIG. 5A;

FIG. 5C is an end view of a transfer gear for coupling the axial elements of the internal drive mechanism shown in FIG. 4A to the radially disposed drive shaft of FIG. 5A;

FIG. 6 is a side view of an external gear mounting shaft, adapted for attachment to the base portion of the drive shaft of FIG. 5A;

FIG. 7 is a side view of an external drive gear configured for mounting on the knurled portion of the shaft of FIG. 6;

FIG. 8 is a side view of a reel gear mounting shaft, adapted for attachment to the crank handle mechanism of a fishing reel;

Corresponding reference numerals indicate corresponding parts throughout the several figures of the drawings.

DESCRIPTION OF THE PREFERRED EMBODIMENT

Figure 10B:
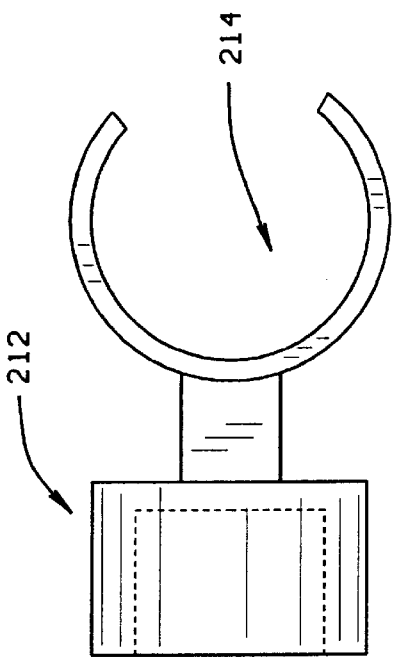
FIG. 10B is an end view of the shield of FIG. 10A.
Figures 9A, 9B:
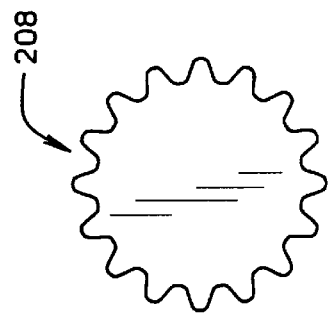
FIG. 9A is a side view of a reducing external reel gear configured for mounting on the knurled portion of the reel gear mounting shaft of FIG. 8.
FIG. 9B is a front view of the reducing external reel gear of FIG. 9A.

The following detailed description illustrates the invention by way of example and not by way of limitation. The description clearly enables one skilled in the art to make and use the invention, describes several embodiments, adaptations, variations, alternatives, and uses of the invention, including what is presently believe to be the best mode of carrying out the invention.

Referring to the drawings, and particularly to FIGS. 1 and 2, reference character 10 generally indicates the hollow cylindrical housing which forms the supporting element onto which a traditional fishing reel 12, a fishing rod 14, and a detachable drive motor 16 are secured. An axial bore 18, having a first uniform diameter D1 and second uniform diameter D2 separated by an internal shoulder 20, extends longitudinally through the housing 10 from an anterior opening 22 in the front surface 24 of the housing 10 to a posterior opening 26 in the base 28 of the housing 10. Housing 10 has an exterior surface 30, which has a fishing reel retaining element 32 formed in it to detachably secure the traditional fishing reel 12 in a fixed position with respect to the housing 10. Those skilled in the art will recognize that additional scallops or contours (not shown) may be machined or formed into the external surface 30 of the housing 10 as needed to allow for necessary clearance of the fishing reel 12 components when installed on the housing 10. Similarly, the exterior surface may be configured to allow for comfortable gripping by a human hand, including the use of rubberized inserts or textured surfaces (not shown).

The retaining element 32 comprises a channel 34 extending from the base 28 to a point approximately midway along the length of the housing 10. The retaining element 32 is configured to receive and retain a supporting stand 33 of fishing reel 12. Those skilled in the art will recognize that while a variety of structures may be incorporated onto the exterior surface 30 of the housing 10 to perform the function of the fishing reel retaining element 30, such as threaded connectors or clamping elements (not shown), the specific structure of the fishing reel retaining element 32 must provided at a minimum, the ability to detachably maintain the fishing reel 12 in a fixed position with respect to the housing 10.

As best seen in FIG. 2, a collet connector 36 is utilized to secure the fishing rod 14 to the housing 10. The collet connector 36 comprises a cylindrical shank portion 38 which merges with an enlarged tapered flange portion 40. An anterior end of the shank portion 38 is preferably beveled as shown at FIG. 2, and the outermost diameter of the flange portion 40 is substantially identical to the outer diameter of the front surface 24 of the housing 10. A base portion 42 has an external diameter D3 reduced from that of the flange portion 40. The diameter D3 of is sized to seat with the anterior opening 22 in the housing 10, so that the base portion 42 extends from the tapered flange 40, the flange 40 forming a recessed shoulder 44 configured to seat against the front surface 24 of the housing. A longitudinal rod receiving bore 46 axially traverses the collet connector 36, and is sized to receive a portion of the fishing rod 14 therein. In the preferred embodiment, the fishing rod 14 is secured within the receiving bore 46 permanently by means of a suitable adhesive, but those skilled in the art will recognize that alternative retaining elements such as lock-screws 45 or clamps may be employed, and that the fishing rod 14 may be secured within the receiving bore 46 in a detachable fashion. Once secured within the receiving bore 46, the fishing rod 14 is attached to the housing 10 by inserting the base portion 42 of the collet connector 32 into the anterior opening 22 in the housing 10 such that the recessed shoulder 44 seats against the front surface 24 of the housing. In the preferred embodiment, the collet connector is removably mounted within the anterior opening 22 by one or more lock screws 48 passing through the exterior of the housing 10 and into the base portion 42. Those skilled in the art will readily recognize that the collet may be detachably mounted by alternative elements such as clamps or threads, provided it may be readily removed and replaced to allow for the interchanging of fishing rods with the housing 10.

Disposed within the first uniform diameter portion of axial bore 18 in housing 10, adjacent the anterior opening 22 is a transfer gear mechanism 49 comprising an axial sub-assembly 50 and a radial sub-assembly 52. The axial sub-assembly 50, shown in FIG. 4, comprises a mounting ring 54 having an outer diameter D4 sized to fit within the first uniform diameter portion of axial bore 18. A recessed axial bore 56 in the mounting ring 54 is sized to receive a bearing element 58 against an internal shoulder 60. The bearing element 58 radially supports an axially aligned adapter shaft 62 which passes through the mounting ring 54. A first portion 64 of the adapter shaft 62, extending from a first face 66 of the mounting ring 54 is configured with a hexagonal external surface 68 to facilitate coupling thereto. Those skilled in the art will recognize that the surface may be knurled or smooth rather than hexagonal. A second portion 70 of the adapter shaft 62, extending from a second face 72 of the mounting ring 54, opposite the first face 66, is fitted with a crown gear 74. The crown gear 74 is preferably secured to the adapter shaft 62 by press fitting, but those skilled in the art will recognize that any of a variety of commonly known methods for securing gears to shafts may be employed. As best seen in FIGS. 1 and 4, crown gear 74 preferably comprises a disk portion 76 affixed to the adapter shaft 62, with a number of axially facing gear teeth 78 arranged in a circumferential pattern. The outer diameter D5 of the disk portion 76 is slightly less than the inner diameter D1 of the axial bore 18.

The radial sub-assembly 52, which together with the axial sub-assembly 50 comprises the transfer gear mechanism 49 is best seen in FIGS. 1 and 5A through 5C. The radial sub-assembly 52 comprises a main radial shaft 80 which includes an elongated shaft portion 82, a bearing seat 84 disposed at one end of the shaft portion 82, and an enlarged receiving socket 86 adjacent the bearing seat 84, opposite the elongated shaft portion 82. The main shaft 80 is seated transverse to the longitudinal axis of the housing 10, within a radial passage 88 located adjacent the anterior opening 22. The location of the radial passage 88 is selected relative to the retaining element 32 on the exterior surface of the housing 10, such that radial passage 88 is displaced 90 degrees about the surface of the housing 10 from a longitudinal centerline C/L of the retaining element 32. In the preferred embodiment shown in FIG. 1, if the retaining element 32 is considered to be at an angular position of zero degrees on the exterior surface of the housing 10, as viewed from the anterior opening 22, the radial passage 88 is shown displaced 90 degrees in a counterclockwise direction. In alternative embodiments, the radial passage 88 may be displaced in the opposite direction, with the associated internal components described below appropriately reversed in position.

When the main shaft 80 is seated within the radial passage 88, the elongated shaft portion 82 seats within a recessed bore 90 in the internal surface of the housing 10 diametrically opposite the radial passage 88. The bearing seat 84 is positioned adjacent the inner surface of the axial bore 18, adjacent the radial passage 88, and the enlarged receiving socket 86 is disposed external to the housing 10, adjacent the radial passage 88. Additionally disposed within the recessed bore 90, and providing radial support for the elongated shaft portion 82 is a bearing member 92. A complementary bearing member 94 is similarly disposed in a second recessed bore 96 concentric with the radial passage 88, providing radial support for the main shaft 80 at the bearing seat 84. A snap-ring 98 or similar retaining mechanism is installed within the second recessed bore 96, behind the bearing member 94 to prevent removal of the main shaft 80 from the radial passage 88.

Fitted about the main shaft 80 is a toothed gear 100. The shaft is keyed at 81, as best seen in FIG. 5B, to mesh with a complementary axial bore 99 in the toothed gear 100 such that rotation of the gear 100 causes rotation of the main shaft 80. The proper positioning of the gear 100 on the shaft 80 is maintained by an expansion spring 102, seen in phantom in FIG. 1, fitted about the elongate shaft portion 82 such that one end of the spring 102 seats against the bearing member 92, and the other end of the spring 102 seats against a face of gear 100. Additional retaining elements, such as a roll pin 104 placed in a pin passage 105 through the shaft 80, or similar functionally equivalent structures, may be employed to retain the gear 100 in the proper position on the main shaft 80, adjacent the interior surface of the axial passage 18.

Once the components of the radial sub-assembly 52 are installed within the housing 10, the axial sub-assembly 50 of the transfer gear mechanism 49 is press-fit inserted within the axial bore 18 as shown in FIG. 1, such that the axially facing gear teeth 78 of the crown gear 74 intermesh with the toothed gear 100 on the main shaft 80, and the face 66 of the mounting ring 54 is substantially co-planar with the internal shoulder 20 in the axial bore 18. In this position, the first portion 64 of the adapter shaft 62, having the hexagon external surface 68 extends axially within the portion of the axial bore 18 having diameter D2 for engagement with the drive motor 16. One skilled in the art will recognize that the intermeshing of the crown gear 74 and the toothed gear 100 act to transfer rotational motion 90 degrees, from axial rotation to radial rotation, and that a variety of gear combinations, such as beveled gears, may be employed within the scope of the invention to accomplish the same design feature.

During use, the detachable drive motor 16 is partially inserted through the posterior opening 26 in housing 10, into the axial bore 18 and engaged with the adapter shaft 62. The drive motor 16 is preferably an axially aligned cordless screwdriver/drill motor although one skilled in the art will recognized that a variety of hand held power tools may serve as the drive motor, and may be employed with the adapter of the present invention. Once inserted partially within the axial bore 18 and engaged with the adapter shaft, the drive motor 16 is secured to the housing 18 by means of an external clamp 104, shown in FIGS. 3A and 3B.

The external motor clamp 104 comprises a pair of matching semi-circular jaws 106A and 106B. The internal surfaces of each jaw 106A and 106B comprises three semi-annular regions of differing curvature. The first region of radius R1 is adjacent the posterior edge of the external clamp 104, and comprises the motor clamping surface 108. The second region 110, inwardly disposed of the first region 108, has a diameter R2, greater than R1, and comprises the housing clamping surface. The final region 112, disposed opposite the first region 108, and adjacent the anterior edge of the external clamp 105, has a radius R3, and forms a retaining lip 114. As best seen in FIG. 3A, semi-circular jaw 106A further includes a pair of tangentially aligned and countersunk threaded bores 116A and 116B for receiving threaded cap-screws 118A and 118B. Semi-circular jaw 106B includes complementary threaded bores 120A and 120B, aligned with threaded bores 116A and 116B on jaw 106A, such that when the cap-screws 118A and 118B are threaded therethrough, the jaws 106A and 106B are secured together in a circular structure. As best seen in FIG. 3A, jaw 106A in the preferred embodiment further includes a recessed axial channel 122 in the inner surface, corresponding to the retaining element 32 on the surface of housing 10.

To retain the drive motor 16 in the housing 10, the jaws 106A and 106B of the external motor clamp 104 are placed about the partially inserted drive motor 16 and housing 10, such that the retaining lip 114 on each jaw is aligned with a circumferential groove 124 in the exterior surface of housing 110. Circumferential groove 124 is located adjacent the base 28 of the housing 10, such that when the threaded cap-screws 118A and 118B are inserted into bores 116A and 116B in jaw 106A, and threaded into bores 120A and 120B in jaw 106B, the retaining lip 114 seats within the groove 124. Furthermore, with the retaining lip 114 seated therein, the housing clamping surfaces 110 grip the exterior surface of the housing 10 immediately adjacent the base 28 of the housing 10, and the motor clamping surfaces 108 grip the drive motor 16. Adjustment of the clamping force applied to the drive motor 16 is possible through the adjustment of the threaded cap-screws 118A and 118B in the threaded bores 120A and 120B. Those skilled in the art will recognize that the external motor clamp 104 described above as the preferred embodiment exerts a radially inward clamping force on both the drive motor 16 and the housing 10, and resists axial movement through the interaction of the retaining lip 114 and circumferential groove 124. Alternative motor retaining elements designed to secure the drive motor 116 partially within the housing 10, such as threaded connectors, may be employed within the scope of this invention.

In the preferred embodiment shown in FIGS. 1, 3A, and 3B, the external motor clamp 104 additionally provides a clamping force sufficient to secure the fishing reel 12 within the reel retaining element 32. The fishing reel base 33 is placed within the channel 34 on the housing 10, such that the base of the reel rests against the surface of the drive motor 16 installed within the housing 10. The jaw 106A of the external motor clamp 104 is then aligned such that the recessed axial channel 122 is aligned with the channel 34 in the housing 10. When the threaded cap-screws 118A and 118B are tightened to secure the drive motor 16 within the housing 10, the recessed axial channel 122 encloses a portion of the fishing reel base within the channel 34, and against the drive motor 16. To release the fishing reel, the external motor clamp 104 must be loosened sufficiently to permit the fishing reel 12 to be lifted from the recessed channel 34.

Figure 10A:
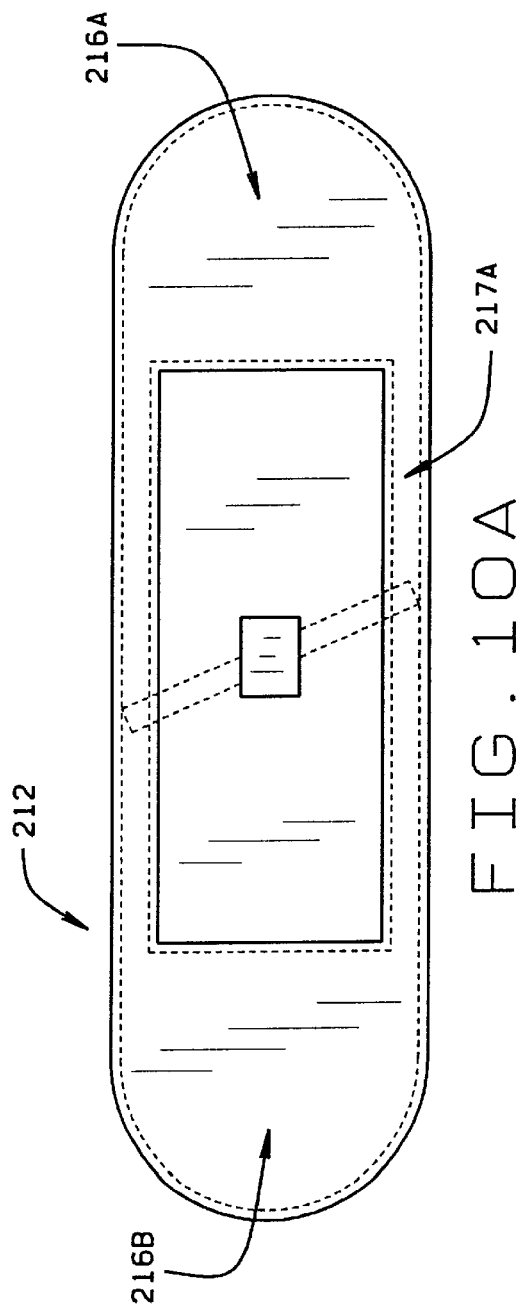
FIG. 10A is a top view of a shield for enclosing the external drive gear and reel gear assemblies.
Figure 11:
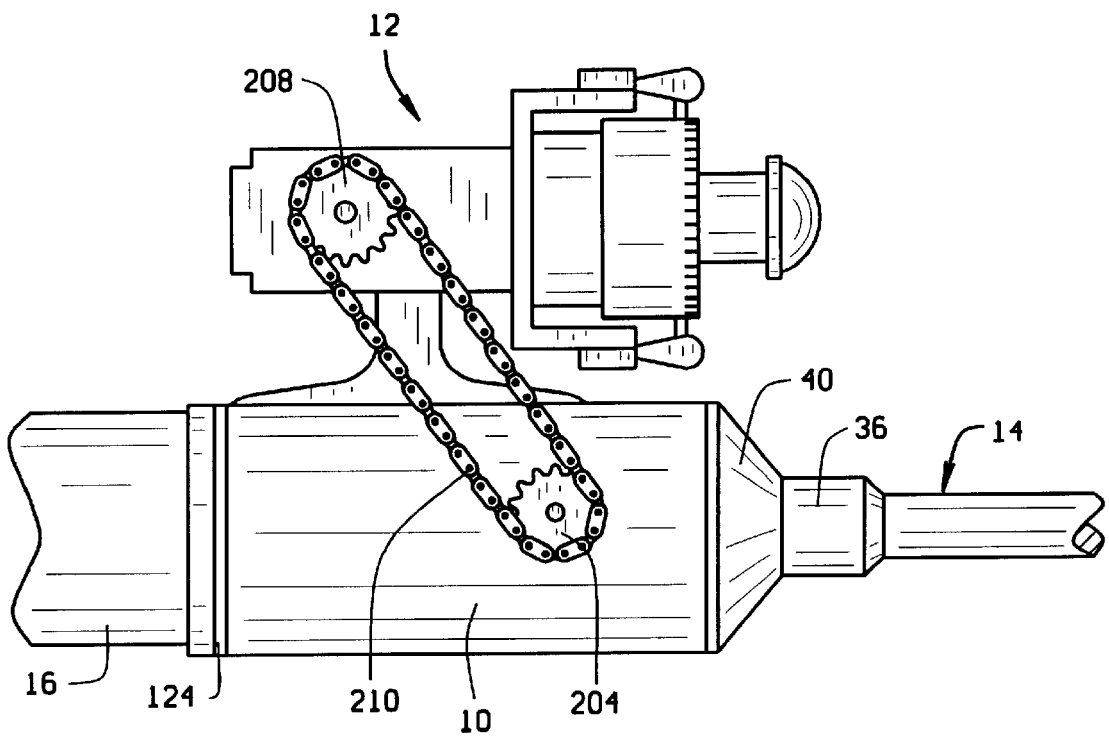
FIG. 11 is a side view of one embodiment of the mounting adapter of the present invention wherein the fishing reel and drive motor are coupled through a chain and sprocket linkage.
Figure 12:
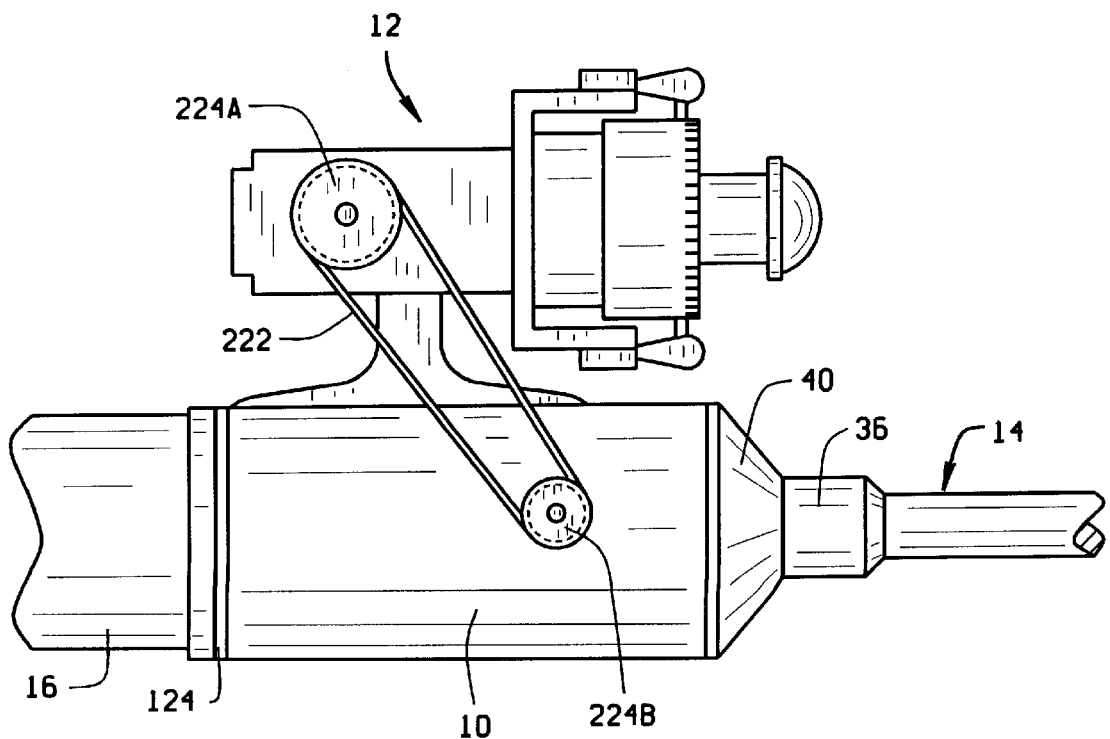
FIG. 12 is a side view of an alternate embodiment of the mounting adapter of the present invention wherein the fishing reel and drive motor are coupled through a belt and pulley system.
Figure 13:
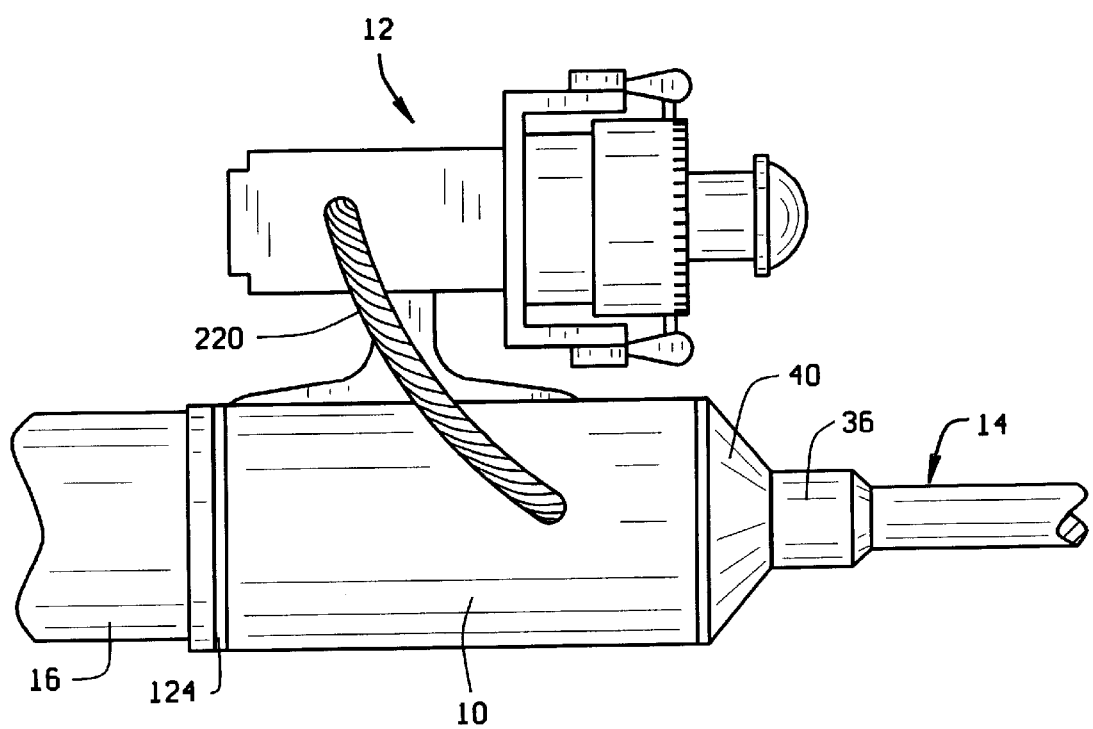
FIG. 13 is a side view of an alternate embodiment of the mounting adapter of the present invention wherein the fishing reel and drive motor are coupled through a flexible cable.

During use of the fishing reel adapter of the present invention, transfer of the rotational motion provided by the drive motor 16 to the winding mechanism (not shown) of fishing reel 12 is accomplished in the preferred embodiment by means of a chain and sprocket combination. Referring to FIGS. 6 through 9B, a stub shaft 200 is shown having a knurled portion 202 for receiving a gear, and a fitted portion 204 configured to match the socket configuration of the enlarged receiving socket 86 in the radial shaft 80. A toothed sprocket gear 205 is press-fitted onto the knurled portion 202, and the fitted portion 204 of the shaft is seated with the enlarged receiving socket 86. On the fishing reel 12, the reel handle (not shown) is removed, and a reel shaft 206 (FIG. 8) operatively installed on the exposed shaft (not shown) extending from the opening, in a spaced relation to the enlarged receiving socket 86, stub shaft 200, and the toothed sprocket gear 204, such that the longitudinal axis of the stub shaft 200 and the reel shaft 206 are parallel. A reducing sprocket gear 208 is secured to the reel shaft 206, preferably by press fitting, allowing for a continuous loop of sprocket chain 210 to operatively connect the sprocket gear 204 and the reducing sprocket gear 208 to form the transfer mechanism. Preferably, the sprocket gears 204 and 208, together with the sprocket chain 210 are constructed from a durable plastic to reduce the need for lubrication and limit operational noise, however, alternative materials such as stainless steel may be employed. A guard or similar enclosure 212 (FIGS. 10A and 10B) is preferably secured about the transfer mechanism to prevent operator injury and to protect the transfer mechanism from damage. As shown in the preferred embodiment, the guard 212 is composed of a durable plastic material, and is secured to the housing 10 by means of a centrally disposed clip 214. Once secured to the housing 10, each sprocket gear 204 and 208 is enclosed within recessed portions 216A and 216B on the underside of the guard 212, and the sprocket chain within elongated channels 217A and 217B.

After the drive motor 16 is installed and secured with the housing 10, actuation of the drive motor 16 by means of a switch (not shown) results in the axial rotation of crown gear 74 in the axial sub-assembly 50, through the interconnection of the drive motor 16 and the axially aligned adapter shaft 62. This rotational motion drives the radially aligned toothed gear 100 in the radial sub-assembly 52, and correspondingly the enlarged receiving socket 86. The resulting rotation of the enlarged receiving socket 86 drives the seated toothed sprocket gear 204, and in turn, the reducing sprocket gear 208 through the sprocket chain 210, actuating the rewinding mechanisms (not shown) within the fishing reel 12. Those skilled in the art will readily recognize that alternative structures for transferring the rotational motion of the enlarged receiving socket 86 to the rewinding mechanisms in the fishing reel 12 may be employed within the scope of this invention. For example, the combination of the sprocket gears 204, 208, and the chain 210 may be replaced by a flexible drive cable 220, or by a belt 222 and pulley system 224A and 224B directly coupled to the reel rewinding mechanism.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A mounting adapter for use with a fishing rod and fishing reel having an internal gear mechanism facilitating casting and rewinding of fishing line, and a battery-powered motorized drive unit for actuating the internal gear mechanism of the fishing reel, comprising:

a cylindrical housing having an internal axial passage, an anterior axial opening, and a posterior axial opening;

a fishing rod shaft adapter configured for removable attachment within the anterior axial opening, said shaft adapter configured to receive the base of a fishing rod;

a drive transfer mechanism disposed within the housing, adjacent the anterior axial opening, said drive transfer mechanism including an axial coupling shaft, a plurality of transfer gears, and an output shaft extending radially outward from said housing through an external shaft opening, said drive transfer mechanism further including:

(i) an axial sub-assembly including said axial coupling shaft, a mounting ring seated within said housing adjacent an internal surface, and at least one internal bearing element disposed within said mounting ring supporting said axial coupling shaft, said axial coupling shaft including a first end comprising a coupling portion, and a second end configured to receive an axially facing crown gear, said crown gear comprising one of said plurality of transfer gears;

(ii) a radial sub-assembly including said output shaft, at least two bearing members seated within opposing recesses in said internal surface of said housing and securing said output shaft in a perpendicular relationship to said axial coupling shaft, said output shaft comprising a first portion disposed within said housing, and a second portion passing through said external shaft opening and disposed external to said housing, said first portion configured to receive a toothed gear comprising one of said plurality of transfer gears;

said axial sub-assembly and said radial sub-assembly disposed within said housing such that said crown gear and said toothed gear intermesh, rotational motion of said axial coupling shaft transferred through said crown gear to said toothed gear, resulting in rotational motion of said output shaft;

a fishing reel attachment element configured to secure said fishing reel to said housing in a fixed relationship to said external shaft opening;

a reel crank mechanism interconnecting said drive transfer mechanism output shaft with said fishing reel internal gear mechanism; and a motorized drive unit attachment element configured to secure said motorized drive unit within said posterior axial opening, such that a drive shaft from said drive unit is coupled to said axial coupling shaft of said drive transfer mechanism, and rotation of said motorized drive unit drive shaft actuates said fishing reel internal gear mechanisms, facilitating rewinding of said fishing line.

2. The mounting adapter of claim 1 wherein said reel crank mechanism is coupled to said second portion of said output shaft.

3. A mounting adapter for use with a fishing rod and fishing reel having an internal gear mechanism facilitating casting and rewinding of fishing line, and a battery-powered motorized drive unit for actuating the internal gear mechanism of the fishing reel, comprising:

a cylindrical housing having an internal axial passage, an anterior axial opening, and a posterior axial opening;

fishing rod shaft adapter configured for removable attachment within the anterior axial opening, said shaft adapter configured to receive the base of a fishing rod;

a drive transfer mechanism disposed within the housing, adjacent the anterior axial opening, said drive transfer mechanism including an axial coupling shaft, a plurality of transfer gears, and an output shaft extending radially outward from said housing through an external shaft opening;

a fishing reel attachment element configured to secure said fishing reel to said housing in a fixed relationship to said external shaft opening;

a reel crank mechanism interconnecting said drive transfer mechanism output shaft with said fishing reel internal gear mechanism, said reel crank mechanism including first and second toothed sprockets linked by a continuous loop of chain, said first toothed sprocket secured to said output shaft, and said second toothed sprocket secured to said fishing reel internal gear mechanism; and a motorized drive unit attachment element configured to secure said motorized drive unit within said posterior axial opening, such that a drive shaft from said drive unit is coupled to said axial coupling shaft of said drive transfer mechanism, and rotation of said motorized drive unit drive shaft actuates said fishing reel internal gear mechanisms, facilitating rewinding of said fishing line.

4. The mounting adapter of claim 3 wherein said second toothed sprocket is a reducing sprocket.

5. The mounting adapter of claim 3 wherein said second toothed sprocket is secured to said fishing reel internal gear mechanism at a crank handle attachment point.

6. The mounting adapter of claim 3 wherein said first toothed sprocket, said second toothed sprocket, and said continuous loop of chain are constructed from plastic.

7. A mounting adapter for use with a fishing rod and fishing reel having an internal gear mechanism facilitating casting and rewinding of fishing line, and a battery-powered motorized drive unit for actuating the internal gear mechanism of the fishing reel, comprising:

a cylindrical housing having an internal axial passage, an anterior axial opening, and a posterior axial opening;

a fishing rod shaft adapter configured for removable attachment within the anterior axial opening, said shaft adapter configured to receive the base of a fishing rod;

a drive transfer mechanism disposed within the housing, adjacent the anterior axial opening, said drive transfer mechanism including an axial coupling shaft, a plurality of transfer gears, and an output shaft extending radially outward from said housing through an external shaft opening;

a fishing reel attachment element configured to secure said fishing reel to said housing in a fixed relationship to said external shaft opening;

a reel crank mechanism interconnecting said drive transfer mechanism output shaft with said fishing reel internal gear mechanism, said reel crank mechanism including first and second pulleys linked by a continuous belt, said first pulley secured to said output shaft, and said second pulley secured to said fishing reel internal gear mechanism; and a motorized drive unit attachment element configured to secure said motorized drive unit within said posterior axial opening, such that a drive shaft from said drive unit is coupled to said axial coupling shaft of said drive transfer mechanism, and rotation of said motorized drive unit drive shaft actuates said fishing reel internal gear mechanisms, facilitating rewinding of said fishing line.

8. A mounting adapter for use with a fishing rod and fishing reel having an internal gear mechanism facilitating casting and rewinding of fishing line, and a battery-powered motorized drive unit for actuating the internal gear mechanism of the fishing reel, comprising:

a cylindrical housing having an internal axial passage, an anterior axial opening, and a posterior axial opening;

a fishing rod shaft adapter configured for removable attachment within the anterior axial opening, said shaft adapter configured to receive the base of a fishing rod;

a drive transfer mechanism disposed within the housing, adjacent the anterior axial opening, said drive transfer mechanism including an axial coupling shaft, a plurality of transfer gears, and an output shaft extending radially outward from said housing through an external shaft opening;

a fishing reel attachment element configured to secure said fishing reel to said housing in a fixed relationship to said external shaft opening;

a reel crank mechanism interconnecting said drive transfer mechanism output shaft with said fishing reel internal gear mechanism, said reel crank mechanism including a length of flexible drive cable coupled between said output shaft and said fishing reel internal gear mechanism such that rotational motion of said output shaft is transferred to said fishing reel internal gear mechanism; and a motorized drive unit attachment element configured to secure said motorized drive unit within said posterior axial opening, such that a drive shaft from said drive unit is coupled to said axial coupling shaft of said drive transfer mechanism, and rotation of said motorized drive unit drive shaft actuates said fishing reel internal gear mechanisms, facilitating rewinding of said fishing line.

9. A mounting adapter for use with a fishing rod and fishing reel having an internal gear mechanism facilitating casting and rewinding of fishing line, and a battery-powered motorized drive unit for actuating the internal gear mechanism of the fishing reel, comprising:

a cylindrical housing having an internal axial passage, an anterior axial opening, and a posterior axial opening;

a fishing rod shaft adapter configured for removable attachment within the anterior axial opening, said shaft adapter configured to receive the base of a fishing rod;

a drive transfer mechanism disposed within the housing, adjacent the anterior axial opening, said drive transfer mechanism including an axial coupling shaft, a plurality of transfer gears, and an output shaft extending radially outward from said housing through an external shaft opening;

a fishing reel attachment element configured to secure said fishing reel to said housing in a fixed relationship to said external shaft opening, said fishing reel attachment element including a longitudinal channel in said cylindrical housing adjacent said posterior opening, said channel disposed orthogonal to said external shaft opening and sized to receive a fishing reel base;

a reel crank mechanism interconnecting said drive transfer mechanism output shaft with said fishing reel internal gear mechanism; and a motorized drive unit attachment element configured to secure said motorized drive unit within said posterior axial opening, such that a drive shaft from said drive unit is coupled to said axial coupling shaft of said drive transfer mechanism, and rotation of said motorized drive unit drive shaft actuates said fishing reel internal gear mechanisms, facilitating rewinding of said fishing line.

10. A mounting adapter for use with a fishing rod and fishing reel having an internal gear mechanism facilitating casting and rewinding of fishing line, and a battery-powered motorized drive unit for actuating the internal gear mechanism of the fishing reel, comprising:

a cylindrical housing having an internal axial passage an anterior axial opening, and a posterior axial opening;

a fishing rod shaft adapter configured for removable attachment within the anterior axial opening, said shaft adapter configured to receive the base of a fishing rod;

a drive transfer mechanism disposed within the housing, adjacent the anterior axial opening, said drive transfer mechanism including an axial coupling shaft, a plurality of transfer gears, and an output shaft extending radially outward from said housing through an external shaft opening;

a fishing reel attachment element configured to secure said fishing reel to said housing in a fixed relationship to said external shaft opening;

a reel crank mechanism interconnecting said drive transfer mechanism output shaft with said fishing reel internal gear mechanism; and a motorized drive unit attachment element configured to secure said motorized drive unit within said posterior axial opening, such that a drive shaft from said drive unit is coupled to said axial coupling shaft of said drive transfer mechanism, and rotation of said motorized drive unit drive shaft actuates said fishing reel internal gear mechanisms, facilitating rewinding of said fishing line, said motorized drive unit attachment element including first and second semi-circular clamping elements, said first and second clamping elements configured to interlock about the cylindrical housing adjacent said posterior opening and to grip said motorized drive unit between first and second clamping surfaces respectively, whereby removal of said motorized drive unit from said posterior opening is prevented.

11. The mounting adapter of claim 10 wherein said first and second semi-circular clamping elements each include a internal retaining lip configured to seat within an external circumferential groove of said housing, preventing longitudinal movement of said clamping elements.

12. The mounting adapter of claim 10 wherein said first and second semi-circular clamping elements are secured together about said housing by a pair of threaded connectors.

13. The mounting adapter of claim 10 wherein said first and second semi-circular clamping elements secure said fishing reel to said housing.

14. A mounting adapter for coupling a fishing rod and a fishing reel having an internal gear mechanism facilitating casting and rewinding of fishing line with a battery-powered motorized drive unit for actuating the internal gear mechanism of the fishing reel, said mounting adapter comprising:

a cylindrical housing having an internal axial passage, an anterior axial opening, and a posterior axial opening;

a fishing rod shaft adapter configured for removable attachment within the anterior axial opening, said shaft adapter configured to receive the base of a fishing rod;

a drive transfer mechanism disposed within the housing, adjacent the anterior axial opening, said drive transfer mechanism including an axial coupling shaft, a plurality of transfer gears, and an output shaft extending radially outward from said housing through an external shaft opening;

a fishing reel attachment element configured to secure said fishing reel to said housing in a fixed relationship to said external shaft opening;

a reel crank mechanism interconnecting said drive transfer mechanism output shaft with said fishing reel internal gear mechanism;

a motorized drive unit attachment element configured to secure said motorized drive unit within said posterior axial opening, such that a drive shaft from said drive unit is coupled to said axial coupling shaft of said drive transfer mechanism, and rotation of said motorized drive unit drive shaft actuates said fishing reel internal gear mechanisms, facilitating rewinding of said fishing line; and a guard element disposed about said reel crank mechanism to enclose said mechanism, said guard element secured to said housing.

15. A mounting adapter for interconnecting a hand held power tool with a fishing rod and a fishing reel with an internal gear mechanism for facilitating casting and rewinding of fishing line, comprising:

a housing having a fishing rod attachment point, a fishing reel attachment point, and a power tool attachment point;

a first transmission mechanism disposed within said housing, said first transmission mechanism including a axial coupling adapted for attachment to said power tool, a radial coupling disposed external to said housing, and a plurality of interconnecting gears linking said axial coupling to said radial coupling for the transmission of rotational motion; and a second transmission mechanism disposed external to said housing, interconnecting said radial coupling and said internal gear mechanism of said fishing reel, whereby rotational motion imparted to said first transmission mechanism by said power tool is transferred to said internal gear mechanism of said fishing reel through said second transmission mechanism, facilitating rewinding of said fishing line, said second transmission including a pair of sprockets and an endless drive chain.

16. A mounting adapter for interconnecting a hand held power tool with a fishing rod and a fishing reel with an internal gear mechanism for facilitating casting and rewinding of fishing line, comprising:

a housing having a fishing rod attachment point, a fishing reel attachment point, and a power tool attachment point;

a first transmission mechanism disposed within said housing, said first transmission mechanism including a axial coupling adapted for attachment to said power tool, a radial coupling disposed external to said housing, and a plurality of interconnecting gears linking said axial coupling to said radial coupling for the transmission of rotational motion; and a second transmission mechanism disposed external to said housing, interconnecting said radial coupling and said internal gear mechanism of said fishing reel, whereby rotational motion imparted to said first transmission mechanism by said power tool is transferred to said internal gear mechanism of said fishing reel through said second transmission mechanism, facilitating rewinding of said fishing line, said second transmission including a pair of pulleys and an endless drive belt.

17. A mounting adapter for interconnecting a hand held power tool with a fishing rod and a fishing reel with an internal gear mechanism for facilitating casting and rewinding of fishing line, comprising:

a housing having a fishing rod attachment point, a fishing reel attachment point, and a power tool attachment point;

a first transmission mechanism disposed within said housing, said first transmission mechanism including a axial coupling adapted for attachment to said power tool, a radial coupling disposed external to said housing, and a plurality of interconnecting gears linking said axial coupling to said radial coupling for the transmission of rotational motion;

a second transmission mechanism disposed external to said housing, interconnecting said radial coupling and said internal gear mechanism of said fishing reel, whereby rotational motion imparted to said first transmission mechanism by said power tool is transferred to said internal gear mechanism of said fishing reel through said second transmission mechanism, facilitating rewinding of said fishing line; and a protective cover affixed to said housing and enclosing said second transmission mechanism therein.

* * * * *